April 2, 1963 J. D. DURKEE 3,084,219

PRINTING TELEGRAPH SELECTIVE SIGNALING SYSTEM

Original Filed Aug. 20, 1953 2 Sheets-Sheet 1

INVENTOR.
James D. Durkee,
BY
John B. Brady
ATTORNEY

PRINTING TELEGRAPH SELECTIVE SIGNALING SYSTEM

Original Filed Aug. 20, 1953 2 Sheets-Sheet 2

INVENTOR

James D. Durkee,

BY John B. Brady

ATTORNEY

United States Patent Office 3,084,219
Patented Apr. 2, 1963

3,084,219

PRINTING TELEGRAPH SELECTIVE SIGNALING SYSTEM

James D. Durkee, Gravette, Ark., assignor to Bell & Gossett Company, a corporation of Illinois Continuation of application Ser. No. 375,536, Aug. 20, 1953. This application Dec. 30, 1958, Ser. No. 785,548
8 Claims. (Cl. 178—23)

Figure 1:
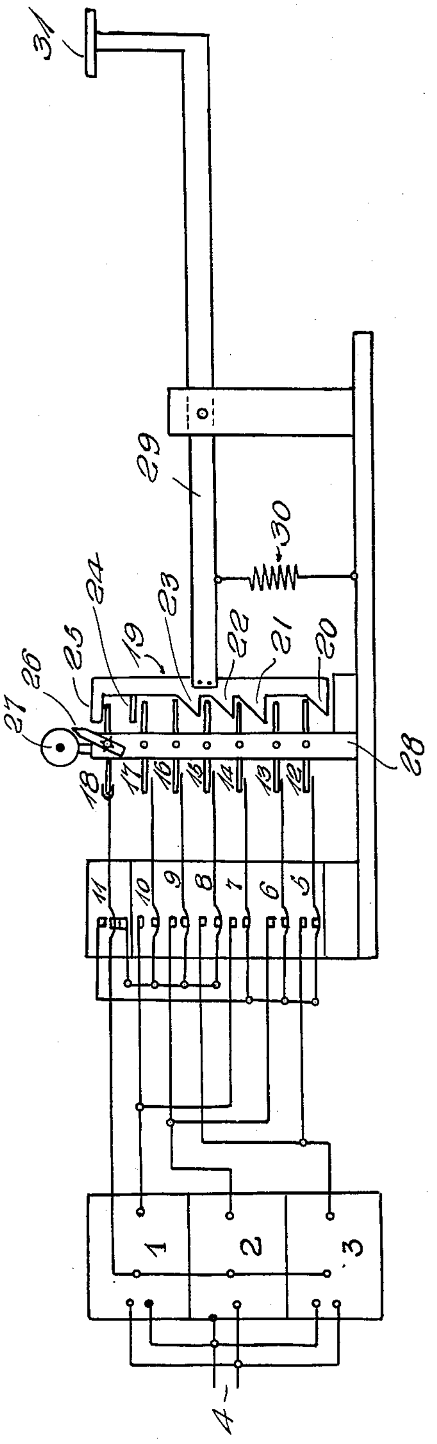

This invention relates to signaling systems such as telegraph systems and relates particularly to printing telegraph transmission and reception.

This application is a continuation of my application Serial No. 375,536 that was filed on August 20, 1953, now abandoned, as a continuation-in-part of my application Serial No. 150,245 filed March 17, 1950, now abandoned.

Practically since the beginning of the use of selective signaling systems for the remote operation of printing telegraph equipment, a series of sequential or simultaneous functions in binary progression has been the accepted solution of the problem of transmitting record communications. The resolution of the permutations and combinations of a binary digit code has been accomplished at the receiving end by a mechanical or electrical "sun-flower" distributor of a matrix which generally follows a formula where the number of combinations possible is equal to two raised to a power represented by the number of sequential operations. In most instances, the basic five-unit code has been used which produces 32 different combinations.

So long as the communication requirements of industry would be met by systems operating at less than 100 words per minute and where the keying speed was not confined by any natural limitation such as the spectrum space available to radio communications, the five-unit system served its purpose.

With the increased demands for higher line speeds in wire record communications systems and the conversion of radio communications circuits to printing telegraph methods, the inherent limitations of any system which requires the transmission of multiple series of impulses to form the character or selection is brought out. Since each binary digit of an impulse is exposed to conversion or alteration in transit by the medium of transmission, i.e., fading and interference in space systems and line variations in wire systems, the potential insecurity of the five or more unit systems is amplified as the speed of transmission is increased.

It is an object of this invention to approach the problem of selective signaling with an entirely different concept of transmission and reception methods. The system herein described discards the conventional five-unit binary code system and utilizes a code requiring a smaller number of operations to accomplish all the various functions incident to printing telegraph systems.

Basically, the system forms each character by transmitting a combination of alternating currents or audio frequency tones in two successive phases or time periods, the combination of the tones in each phase being different. The receiving system records the first phase or combination of tones in a first selector which determines the selected group of a plurality of groups of electromagnetic relays. This first selector is locked in position and isolated from subsequent receiver input signals. By varying the combination of the tones any desired group may be selected.

The combination of tones transmited during the second phase is presented to a second selector, similar to the first or primary selector. The second selector is operative to determine an individual electromagnetic relay in one of the groups.

The first and second selectors are arranged in a network to form a polarized matrix which provides a path for a positive current through any one of the electromagnetic relays or other electrically operated device.

The polarized matrix is differential in its selective arrangement in that it will pass current only when a difference exists in the arrangement of the primary and secondary selectors.

It is a further object of this invention to provide for transmission and reception of signals without resorting to synchronization or start-stop operation which necessarily involves the transmission of synchronizing or start-stop signal impulses.

Another object of this invention is to obtain a greater number of permutations and combinations than the systems currently in use while reducing the frequency bandwidth.

A further object of this invention is to provide means for indicating erroneous reception of signals which has been caused by interference or fading in space systems or line variation in wire systems.

A still further object of this invention is to provide for error indication without translating or broadening the selected code and without the transmission of tracer or comparator signals.

While the invention is particularly designed for printing telegraphs it is evident that it may be utilized for other purposes where it is desired to select and operate any one of a large number of devices at a remote point.

Figure 2:
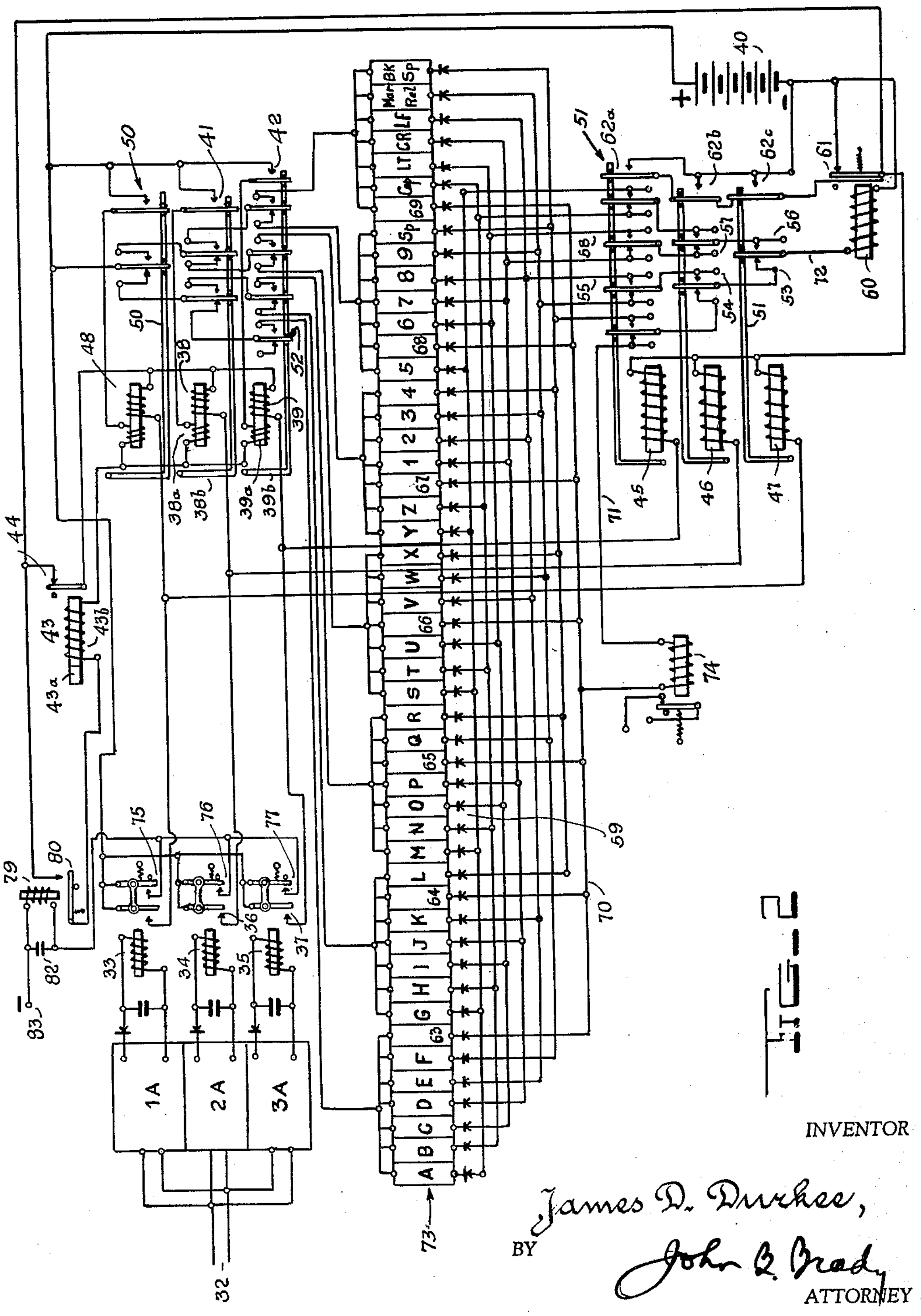

In the drawings, FIG. 1 is a diagrammatic view of the transmitting apparatus. FIG. 2 is a similar view of the receiving apparatus.

As shown in FIG. 1 there are three audio frequency (tone sources) oscillators 1, 2 and 3, at the transmitter. These oscillators are connected to a line or radio transmitter at the output terminals indicated at 4. Seven switches of the micro switch type are illustrated at 5, 6, 7, 8, 9, 10 and 11. Switches 5, 6, 7, 8, 9 and 10 are single pole single throw. The switch indicated at 11 is single pole double throw. A common contact on switches 5, 6 and 7 is connected to the upper contact of switch 11 and a common contact on each of switches 8, 9 and 10 is connected to the lower contact on switch 11. The single pole contact of switch 11 is connected to a common contact on the keying control of the three oscillators (tone sources) 1, 2 and 3. The upper contacts of switches 7 and 10 connect to oscillator 1, the upper contacts on switches 6 and 9 to oscillator 2, and the upper contacts on switches 5 and 8 to oscillator 3. The switches are actuated by seven actuator bars 12, 13, 14, 15, 16, 17 and 18 supported in a frame the end of which is shown at 28. The actuator bars 12 to 17 are controlled by fingers which extend from code bar 19. In the particular illustration shown by FIG. 1 there are four such fingers, designated by 20, 21, 22 and 23. The arrangement of fingers on code bar 19 in relation to actuator bars 12 and 17 determines the combination of tones to be transmitted by oscillators 1, 2 and 3.

Code bar 19 is attached to key lever 29 which is biased by spring 30. Key lever 29 is pivoted when key button 31 is depressed.

Actuator bar 18 is controlled by fingers 24 and 25 which also extend from code bar 19. Attached to the shaft of bar 18 is a pin 26. Upward pressure of finger 24 on the peripheral edge of bar 18 will cause the pin 26 to pass to the left of center of spring roller 27 which will result in locking of the bar 18 in a depressed position. Downward movement of finger 25 will restore pin 26 and bar 18 to their normal position.

In the operation of the transmitter section, as key 29, which may represent the letter "O," is depressed, finger 20 presses against actuator bar 12 causing switch 5 to close contacts. Finger 21 causes actuator 14 to close switch 7. Finger 22 causes actuator 15 to close switch 8, and finger 23 causes actuator 16 to close switch 9. Switches 10 and 6 are not affected in this instance since there are no fingers to operate actuator bars 13 and 17.

During the upward movement of code bar 19 the lower contact of switch 11 connects switches 8 and 9 to oscillators 2 and 3 through the common lead of the oscillators to the single pole of switch 11, thus keying these two oscillators. When finger 24 on code bar 19 strikes actuator bar 18, switch 11 will be flipped so that oscillators 1 and 3 will be connected to switches 5 and 7. Oscillators 1 and 3 will be keyed as long as pin 26 presses against roller 27 holding switch 11 in contact with its upper contact. When key 29 is released, spring 30 pulls code bar 19 back to its original position and when finger 25 strikes actuator bar 18, switch 11 is restored to its original position. At this time fingers 20, 21, 22 and 23 have released actuators 12, 14, 15 and 16 thus causing switches 5, 7, 8 and 9 to open. The transmission of one character has thus been effected and thereby completes one cycle of operation.

It will be observed that the transmission of the illustrative character "O" was completed in two phases. In the first phase oscillators 2 and 3 were keyed and in the second phase oscillators 1 and 3 were keyed. For a purpose hereinafter explained, it is essential that the two phases be of different character. The time delay between phases is not essential to the operation of the receiver section and is of very short duration such that the transmission thereof is practically of a continuous nature. The changeover, or flipping of switch 11 from upper to lower contacts determines the phasing and is essentially instantaneous.

Signals transmitted by the process and apparatus described in connection with FIG. 1 are impressed on line 32 of FIG. 2 as audio tones of the frequencies generated by oscillators 1, 2 and 3 of FIG. 1. The reception may be either by radio or wire. From line 32 these signals are impressed on selective amplifiers or tuned reeds 1A, 2A and 3A. Depending upon the particular combination of tones, relays 33, 34 and 35 may be actuated.

As previously described, oscillators 2 and 3 were keyed during the first phase of the transmitted signals. This will cause relays 34 and 35 to operate closing contacts 36 and 37. The closing of contacts 36 and 37 places current from battery 40 on relay coils 38 and 39 of double-wound cores.

The reference numeral 50 generally indicates contacts and switches which constitute a selecting circuit. The particular circuit employed by this device is generally known as a cascade switch. When coils 38 and 39 are energized, armatures **38*b* and 39*b* will cause the cascade switch to establish a circuit path through the switch to a particular one of the plurality of groups of operating solenoids for selectively functioning the printing telegraph mechanism generally designated at 73. Contacts 41 and 42 will also be closed, which causes current from battery 40 to pass through relay coils 38*a* and 39*a* of the double-wound cores. Cascade switch 50 will then be locked in position until the current in coils 38*a* and 39*a* is removed. In series with the coils 38*a* and 39*a* is the coil of relay 43 which, upon the passage of current therethrough, opens the contact 44. Opening the contact 44 breaks the circuit from battery 40 through contacts 36 and 37 of relays 34 and 35 and coils 38 and 39 respectively. This action removes the possibility of relays 33, 34 or 35 from further affecting cascade switch 50 as long as contact 44 is open. Relay 43 is slow to make as provided by the copper slug 43*a* at the end of core 43*b* so that if signals of the first phase do not arrive quite close together relay contacts 44 will not operate before the combination is completely received. Loss of the effect of the first phase of the signal combination is avoided by providing a second set of contacts on relays 33, 34 and 35 shown at 75, 76 and 77 electrically connected to provide a circuit through the winding of relay 79 as shown to break the back circuit of relays 39, 38 and 48 when a signal is received and not immediately followed by another signal. The relays 33, 34 and 35 control contacts 75, 76 and 77 and place positive polarity from battery 40 on relay coil 79 to negative battery 83 whenever the respective relays are operated. This current in the winding of relay 79 causes the contacts 80 to close, completing the circuit through the winding of relay 43 to negative battery 40 and the locking coils of relays 48, 38 and 39. The condenser 82 holds the contacts closed for a short period of time during the changeover of the signal combination. If no changeover occurs during this period of time contacts 80 open and break the circuit through the coil to relay 43 so that contacts 44 close for operating cascade switch 50**.

Simultaneous with the actuation of coils 38 and 39 relay coils 45 and 46 are energized. Relay coils 45 and 46, together with coil 47, control a second cascade switch or selecting circuit which is generally designated at 51. No locking means is provided for this cascade switch and it is to be noted that the common return circuit of coils 45 and 46 to battery 40 does not pass through contact 44 as does the common return of coils 38 and 39. Coils 45, 46 and 47 will thus be subject to subsequent operation of relays 33, 34 and 35 upon reception of the second phase of the transmitted signal.

It is to be further noticed that the cascade switches are differentially arranged. When corresponding relay coils of the switches are energized, no circuit path will be established through any of the operating solenoids. The circuits established by the combination of tones in the first phase of the illustration may be traced as an example. During this first phase, relay coils 38 and 39 and relay coils 45 and 46 were actuated and the circuit from the positive terminal of battery 40 may be traced through the contacts of cascade switch 50 to the common contact 52 of the group of solenoids represented by the letters M, N, O, P, Q and R and from the negative terminal of battery 40 through contacts 53, 54 and 55 of cascade switch 51. It will be seen, however, that in so tracing no provision is allowed for the circuit to be closed through any of the solenoids connected to contact 52 as long as the two switches have the same arrangement of contacts, that is, when the contacts of cascade switches 50 and 51 are shifted identically there is no through circuit to any of the operating solenoids.

In order for the device to operate as illustrated, the matrix must be polarized. To serve this purpose rectifiers are associated with the individual solenoids and perform two functions. During the first phase the solenoid groups are isolated insofar as direct current cannot pass from one group through another. During the second phase the rectifiers provide a very high impedance for a complex series parallel circuit which would otherwise present a relatively low impedance in parallel to the selected solenoid.

With the beginning of the second phase or changeover, the combination of tones present in the transmitted signal causes relay coils 45 and 47 to be energized due to the presence of tones in filters or reeds 1A and 3A which, in turn, actuates relays 33 and 35. This will change the position of cascade switch 51 by the de-energization of relay coil 46 and the energization of relay coils 45 and 47. A circuit will then be provided through cascade switch 51 by contacts 56, 57 and 58, rectifier 59, letter solenoid "O" to contact 52 and then through cascade switch 50. A closed circuit may now be traced from the positive terminal of battery 40 through the system of selectors, the relay 60 and then to the negative terminal of the battery 40. The completion of this circuit causes letter solenoid "O" to be operated. It will also cause relay 60 to attract its armature and open contacts at 61 which breaks the locking circuit of the first selector and opens the return circuit to battery 40 of the control relays associated with the second selector. The system is now restored to normal position awaiting the receipt of a new combination of tones.

It may be observed that contacts 61 are shorted as long as any one of contacts 62a, 62b, or 62c is closed. This prevents the system from returning to normal until after the removal of the signal from filters 1A, 2A or 3A, which occurs when the transmitting cycle is completed and the oscillators are no longer being keyed.

By varying the arrangement of the selectors it can be shown that any one of forty-two operational functions may be performed. In FIG. 2 these functions are represented by letter solenoids A to Z, figure solenoids 1 to 9 inclusive and the typing function Space, Capitals, Letters, Carriage Return, Line Feed, Margin Release and Back Space.

The combinations of tones necessary to effect these various functions are set forth in code form as follows:

*Double-Phase Three-Tone Code*

Each phase consists of a combination of three tones A, B and C, where tone $A=1$, tone $B=2$, tone $C=3$, tones $AB=4$, tones $AC=5$, tones $BC=6$ and tones $ABC=7$.

| Phase 1 | Phase 2 | Function |
|---|---|---|
| 1 | 1 | not used |
| 1 | 2 | F |
| 1 | 3 | E |
| 1 | 4 | D |
| 1 | 5 | C |
| 1 | 6 | B |
| 1 | 7 | A |
| 1 | 0 | Spare |
| 2 | 1 | L |
| 2 | 2 | not used |
| 2 | 3 | K |
| 2 | 4 | J |
| 2 | 5 | I |
| 2 | 6 | H |
| 2 | 7 | G |
| 2 | 0 | Spare |
| 3 | 1 | R |
| 3 | 2 | Q |
| 3 | 3 | not used |
| 3 | 4 | P |
| 3 | 5 | O |
| 3 | 6 | N |
| 3 | 7 | M |
| 3 | 0 | Spare |
| 4 | 1 | X |
| 4 | 2 | W |
| 4 | 3 | V |
| 4 | 4 | not used |
| 4 | 5 | U |
| 4 | 6 | T |
| 4 | 7 | S |
| 4 | 0 | Spare |
| 5 | 1 | 4 |
| 5 | 2 | 3 |
| 5 | 3 | 2 |
| 5 | 4 | 1 |
| 5 | 5 | not used |
| 5 | 6 | Z |
| 5 | 7 | Y |
| 5 | 0 | Spare |
| 6 | 1 | Margin Release |
| 6 | 2 | 9 |
| 6 | 3 | 8 |
| 6 | 4 | 7 |
| 6 | 5 | 6 |
| 6 | 6 | not used |
| 6 | 7 | 5 |
| 6 | 0 | Spare |
| 7 | 1 | Back Space |
| 7 | 2 | Space |
| 7 | 3 | Letters |
| 7 | 4 | Capitals |
| 7 | 5 | Line Feed |
| 7 | 6 | Carriage Return |
| 7 | 7 | not used |
| 7 | 0 | Spare |

The number of operational functions which may be obtained through the use of this code depends upon the number of tones or impulses utilized to control the selecting circuits and the number of phases in which the signal is transmitted. This may be more concisely expressed by the formula $S=K^n$, where S is the resultant number of functions, K is the number of selector circuit paths controlled by each phase, and $n$ is the number of phases.

It will be noted that the operational functions enumerated above are arranged in groups with six functions and a spare in each group. The spares are designated by 63, 64, 65, 66, 67, 68 and 69 and may provide an alternate circuit from the first selector through each of the groups to a common lead 70 through relay 74 and then through lines 71 and 72 of the second selector and through relay 60 to the negative terminal of battery 40. This circuit is utilized to print a special character such as an "underlined space" when there is a loss of the first or second phase of the transmitted signal due to fading, interference or other causes. In case of such a loss the first selector will be set and locked according to the character of any signal that operates relays 33, 34 or 35. The failure to receive a second half or phase of a signal will cause relay 74 to be operated. This circuit may be traced through the first selector to the selected alternate circuit in one of the groups, through relay 74, common lead 70, lines 71 and 72 of the second selector through relay 60 and the negative terminal of battery 40. Relay 74 will then operate any convenient means of error indication. The operation of relay 60 also clears the system preparatory to the receipt of another signal.

Since only a portion of each component of the signal constituting the transmitted character need be properly received to form the character, a wide margin of transmitting security can be achieved by the use of this system. Fading, interference or other signal-reducing effects may substantially obliterate the signal but as long as a portion of each phase near the point of changeover is received, the correct character is printed. If only a portion of a single phase is received, an "underlined space" is printed which may be of great value in identifying the missing character.

Where a complete duplex or simplex circuit is in operation, relay 74 may also be used to transmit an impulse which will cause the transmitting station to stop further transmission of the message and repeat the transmission of the missing character.

The time required to form the characters need be sufficient only to close two sets of relays. Thus, enormous increases in the speed of transmission may be realized over the present systems without the need for additional band space in the radio frequency spectrum.

It is contemplated that the system herein described is easily adaptable to fields of utility other than telegraph printing. For example, the forty-four operational functions required by teletype setting may be obtained by the substitution of operating solenoids in the shorting circuits 63 through 69 inclusive. The total operating functions would be increased to 49, well within the number required in the teletype-setting art. If such a substitution is made, relay 74 will, of course, be removed.

This system may also be adapted for selective calling where it is desired to permit operation of particular telegraph printers. In this event, spares 63 through 69 would be replaced by start and stop devices individual to each printer. A first combination of tones would then be utilized to effect the selection of the desired printer. It is evident that a total of seven printers may be controlled by the described system.

While I have described my invention in certain of its preferred embodiments, I desire that it be understood that modifications may be made and that no limitations upon my invention are intended other than may be imposed by the scope of the appended claims.

I claim:

1. A printing telegraph system in which the characters are represented by coded dual phase audio frequency signals, each signal embracing successive combinations of impulses, a signal input system, a plurality of relays having windings connected with said input system, a separate rectifier interposed between said input system and each of the windings of said relays, printing telegraph apparatus including a plurality of groups of operating solenoids, each solenoid including a separate rectifier circuit individual thereto and to one of said rectifiers, said relays being responsive to combinations of impulses impressed upon said input system, selector means controlled by said relays responsive to a succeeding combination of impulses to select an individual solenoid through the rectifier circuit individual thereto, a first and second set of contacts controlled by said relays, the first set of said contacts operating to control said selector means a separate relay, the second set of said contacts operating to control said separate relay for independently controlling said means that selectively operates the plurality of groups of operating solenoids and in which said separate relay includes an operating winding and a condenser connected in shunt thereto, said condenser being charged through the operation of the second mentioned sets of contacts for maintaining the separate relay in operation for a predetermined time period.

2. In a printing telegraph system in which the characters are represented by successive combinations of signal dual phase impulses, selective input circuits, relays controlled by said input circuits, a printing telegraph apparatus including a multiplicity of operating solenoids, first and second cascade selectors operative to control said operating solenoids, said first cascade selector operating in response to a combination of signal impulses to select one group of said operating solenoids and said second cascade selector operating in response to a succeeding combination of signal impulses to select an individual solenoid from the said solenoid group of solenoids selected by said first cascade selector, an error-indicating circuit, said first cascade selector operating to establish an alternate circuit path through said error-indicating circuit under conditions of failure of one or both phases of the succeeding combination of impulses to activate said second cascade selector.

3. Selective signaling apparatus for reception and recordation of an intelligible functional signal that is comprised of a plurality of tones transmitted sequentially as different first and second-phase signal components, said apparatus comprising tuned frequency-responsive means for each tone to be received, a plurality of operating devices for individual selection by a functional signal, first-phase electric circuit means distinctively operable in response to the receipt of a first-phase signal component by the frequency-responsive means corresponding thereto to establish circuit portions to each one of a group of said operating devices, means responsive to distinctive operation of said first-phase electric circuit means for establishing a delay circuit for maintaining such distinctive operation pending receipt of a second-phase signal component, second-phase electric circuit means distinctively operable in response to the receipt by the frequency-responsive means corresponding thereto of a second-phase signal component that is distinctively different from the said received first-phase signal component to establish a circuit portion to complete an actuating circuit to one device of said group of operating devices, and means responsive to energization of said one device through said actuating circuit for restoring said delay circuit and said first and second-phase electric circuit means to original condition.

4. The arrangement of claim 3 wherein said apparatus includes an error-indicating circuit and said first-phase electric circuit means includes means operating to establish an alternate circuit path through said erorr-indicating circuit under conditions of failure of the second-phase signal component to activate said second-phase electric circuit means.

5. Selective signaling apparatus for reception and recordation of an intelligible functional signal that is comprised of a plurality of tones transmitted sequentially as different first and second-phase signal components, said apparatus comprising tuned frequency-responsive means for each tone to be received, a plurality of operating devices for individual selection by a functional signal, a plurality of main relay means individually associated with and operated by said frequency-responsive means, first-phase relay means individually associated with and operated by said main relay means in response to the receipt of a first-phase signal component by the frequency-responsive means corresponding thereto to establish circuit portions to each one of a group of said operating devices, delay relay means responsive to operation of said first-phase relay means for establishing a delay circuit for maintaining the operation of said first-phase relay means pending receipt of a second-phase signal component, second-phase relay means individually associated with and operated by said main relay means in response to the receipt by the frequency-responsive means corresponding thereto of a second-phase signal componentt different from the said received first-phase signal component to establish a circuit portion for completing a circuit to one device of said group of operating devices, and relay means responsive to energization of said one device through said actuating circuit for restoring said delay relay means, said first-phase relay means, and said second-phase relay means to original condition for receiving a subsequent functional signal.

6. A selection system for establishing electrical connection at a desired point in a matrix by a signal including first and second frequency components applied in sequence, said system including in combination, a plurality of frequency-responsive means each operable in response to reception of a component of a particular frequency, a first plurality of circuit means each individually coupled to and operated in response to operation of said frequency responsive means and defining one coordinate of the matrix, means including switching means responsive to a first frequency component for operation of one of said first plurality of circuit means and for disabling all of the other of said first plurality of circuit means, and a second plurality of circuit means each individually coupled to and operated in response to operation of a frequency responsive means to which one of said first plurality of circuit means is coupled, said second plurality of circuit means being operated by said frequency responsive means in response to a second frequency component different from the first frequency and received subsequent to reception of the first frequency component, said second plurality of circuit means defining the other coordinate of the matrix, each circuit means of said first plurality having portions cooperating with said circuit means of said second plurality so that a connection is established at a point defined by an operated circuit means of said first and second groups.

7. A selection system for establishing electrical connection at a desirerd point in a matrix by a signal including components of first and second frequencies applied in sequential order, said system including in combination, a plurality of frequency responsive means each operable in response to reception of a component of a particular frequency, a plurality of relay means individually associated with and operated in accordance with operation of said frequency responsive means and defining one coordinate of the matrix in response to the first frequency component, means responsive to operation of one relay means for disabling non-operated relay means, and a plurality of circuits each individually associated with a frequency responsive means in common with one of said relay means, said plurality of circuits being energized by operation of said frequency responsive means and defining the other coordinate of the matrix in response to the second frequency component, said plurality of circuits including means for maintaining the one relay means operative on reception of the second frequency component, said relay means having contact means cooperating with said circuit means so that a connection is established at a point defined by an operated relay and an energized circuit, whereby the signal component of first frequency energizes one frequency responsive means and the associated relay means and the signal component of second frequency energizes one circuit portion to make a connection at a selected point on the matrix.

8. A control system for selecting a point in a matrix of points in response to a signal including components of first and second frequencies applied in sequence thereto, said system including in combination, a plurality of selector frequency responder means each operable in response to reception of a component of a particular frequency, a plurality of first relay means individually associated with and operated by said selector frequency responder means and having circuit portions establishing respective columns of the matrix upon energization of a first relay means, a plurality of second relay means individually associated with and operated by said first relay means and having sets of contact means establishing respective rows of the matrix upon energization of a second relay means, means responsive to operation of one of said second relay means for disabling other non-operated second relay means, and circuit means associated with a point in the matrix and adapted to be operated by an established row and column thereof, whereby a circuit portion and a contact means cooperate so that a point is selected by reception of a signal component of first frequency to operate a first relay means and its associated second relay means and a signal component of second frequency to operate another first relay means.

References Cited in the file of this patent

UNITED STATES PATENTS

| | | |
|---|---|---|
| 1,326,727 | Hammond | Dec. 20, 1919 |
| 1,805,867 | Compare | May 19, 1931 |
| 2,008,273 | Chireix et al. | July 16, 1935 |
| 2,058,398 | Bear | Oct. 27, 1936 |
| 2,628,277 | Spencer | Feb. 10, 1953 |